United States Patent Office 2,931,841
Patented Apr. 5, 1960

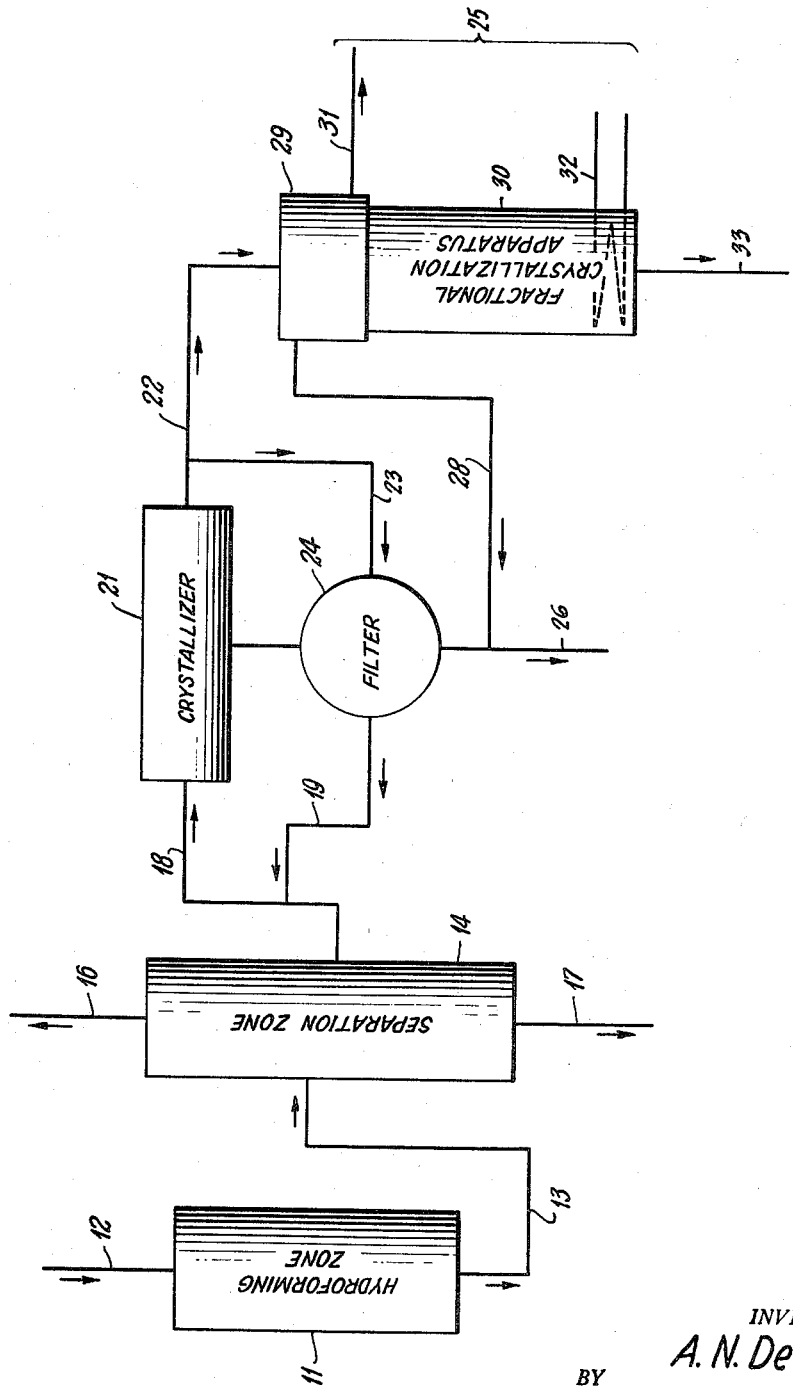

2,931,841

FRACTIONAL CRYSTALLIZATION PROCESS

Albert N. De Vault, Bartlesville, Okla., assignor to Phillips Petroleum Company, a corporation of Delaware Application May 20, 1954, Serial No. 431,119

11 Claims. (Cl. 260—666)

This invention relates to the separation and purification of components of liquid mixtures. In one of its more specific aspects, it relates to the separation and purification of liquid multi-component mixtures by fractional crystallization. In another of its more specific aspects, it relates to a fractional crystallization process whereby needle type crystal formation is substantially eliminated. In still another of its more specific aspects, it relates to an improved process for the production of para-xylene.

In the separation of chemical compounds, fractional crystallization processes find many applications. There are many instances where separation by distillation or by solvent extraction are impracticable or impossible, and the desired separation can only be carried out by means of fractional crystallization. When it is desired to separate chemical isomers having similar boiling points and solubilities, or materials having relatively high boiling ranges, or thermally unstable substances, or solutions containing both volatile and non-volatile impurities of undesired constituents, separation by fractional crystallization may well be the only practical method which can be employed.

There is the further advantage in using a crystallization method of separation, in that this separation method is the only one which theoretically produces a pure product in a single stage of operation. It has been found in actual practice, however, that the crystals obtained from a solution of several components are impure because of the occlusion of mother liquor within the crystal interstices. Numerous fractional crystallization processes have been proposed in order to provide for the removal of occluded impurities from the crystals. In one method of operation, a series of centrifuges are employed so as to obtain crystals of progressively increasing purity. Recently, a continuous process for separating and purifying liquid multi-component mixtures has been disclosed which utilizes a crystal purification column in one end of which a melting zone is maintained. This latter process involves cooling a liquid multi-component mixture from which the separation is to be made so as to form crystals of at least the higher melting component and thereafter separating the crystals from the mother liquor. The crystals are then introduced into the purification column and are moved therethrough in a compact, contiguous mass toward the melting zone where the crystals are melted. A portion of the melt is withdrawn as product while the remainder is displaced as a reflux stream countercurrently to the movement of crystals and in intimate contact therewith so as to remove the occluded impurities. The high purity of product obtainable is due primarily to the washing action of the reflux stream passing through the purification column countercurrent to the movement of crystals.

When separating and purifying liquid multi-component mixtures by fractional crystallization, it has been found that the crystals assume various shapes from small needles to large plates with intermediate lath-like and granular forms. The presence of needle-like crystals may have a deleterious effect upon the operation of the particular crystal separation process utilized. Accordingly, the separation of this type of crystal from a slurry by filtering is very difficult. When filtering a slurry containing small, needle-like crystals, the crystals have a tendency to pass through the filter medium with the mother liquor, thereby resulting in a loss of product. When practicing a fractional crystallization process which employs a centrifuge, the small, needle-like crystals tend to leave the centrifuge along with the mother liquor. In accordance with the present invention, a fractional crystallization process is provided which substantially eliminates the formation of small, needle-like crystals and results in the formation of large, easily filterable crystals.

The following objects of the invention will be attained by the various aspects of the invention.

It is an object of the invention to provide an improved continuous process for the separation and purification of liquid multi-component mixtures.

Another object is to provide an improved process for the separation and purification of liquid multi-component mixtures whereby the formation of small, needle-like crystals is substantially eliminated.

A further object is to provide an improved process for the production of para-xylene.

Yet another object is to provide a process for the production of para-xylene, wherein improved, filterable crystals of para-xylene are formed.

Still other objects and advantages will become apparent to those skilled in the art from the following disclosure.

Broadly speaking, the present invention comprises chilling in a cooling zone a liquid multi-component mixture, containing a component which crystallizes first upon lowering the temperature of the mixture, to a temperature such as to form a slurry of crystals of said component and mother liquor. A portion of the slurry is filtered so as to form a concentrate of said component, which concentrate is then returned to the cooling zone, thereby increasing the concentration of said component in the liquid multi-component mixture in the cooling zone. The remainder of the slurry removed from the cooling zone is passed to a crystal separation and purification zone wherein said component is recovered as high purity product. By increasing the concentration of said component in the liquid multi-component mixture, large, easily filterable crystals are formed in the cooling zone, thereby promoting a more efficient product separation in the crystal purification and separation zone.

The fractional crystallization process of this invention is applicable to a great number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. Specific examples of organic systems to which this invention is applicable are disclosed by J. A. Weedman in copending U.S. application, Serial No. 166,992, filed June 9, 1950, now U.S. Patent No. 2,747,001, and of particular importance, there may be mentioned separation of systems containing xylenes, systems containing cyclohexane, systems containing normal paraffins, systems containing benzene, and the like. Accordingly, it has been found that para-xylene can be separated from a multi-component mixture comprising isomeric alkyl benzenes, that benzene can be separated from a mixture comprising a paraffinic hydrocarbon and benzene, and that cyclohexane can be separated from a mixture comprising a paraffinic hydrocarbon and cyclohexane. Other organic chemicals which may be mentioned include pyridines, dimethylphthalates and fatty acids.

The present invention is applicable to inorganic mixtures as well as organic mixtures, and offers a practical method of separating two inorganic compounds between which solvates or hydrates are formed. Examples of inorganic systems to which this invention is applicable are those for the recovery of pure salts, such as ammonium nitrate, and of anhydrous salts from their hydrates.

In certain cases, it may also be desirable to recover the mother liquor separated from the crystals as a product of the process. This situation arises when it is desired to increase the concentration of a dilute solution. This aspect of the invention is especially applicable to the production of concentrated food products which involves primarily the removal of water from these products. Accordingly, by utilizing the process of this invention, water can be removed from fruit juices, such as grape, orange, lemon, pineapple, tomato, and the like. It is also possible to concentrate vegetable juices and beverages, such as milk, beer, wine, coffee and tea, by this method. This aspect of the invention is, in general, applicable to those situations where it is desired to increase the concentration of a solution by removing at least a portion of the solvent therefrom with a minimum of solute remaining in the removed solvent.

While it is not intended to limit the invention to the separation and purification of any particular liquid multicomponent mixture, in the interest of clarity and understanding, the invention will be described hereinafter as it relates to the separation of para-xylene from a mixture of the same and at least one other isomeric xylene. The primary source of para-xylene is from petroleum and coal tar xylene fractions which normally comprise ortho-, meta-, and para-xylenes and ethylbenzene, the content of para-xylene usually varying between 10 and 20 weight percent. With the recent development of synthetic fabrics, which has resulted in an increased demand for para-xylene, considerable interest has been directed toward the development of other sources of supply, particularly toward the preferential conversion of hydrocarbons to para-xylene. Accordingly, suitable hydrocarbon fractions for the production of xylene isomers may be obtained by aromatization, utilizing the hydroforming process which is well known in the petroleum industry.

For a more complete understanding of the invention, reference may be had to the following description and the drawing which is a schematic flow diagram illustrating an arrangement of apparatus suitable for practicing the process of this invention. The separation and purification of para-xylene will be discussed, but, as has been previously mentioned, the invention is not limited to this particular compound. Conventional apparatus, such as pumps, valves, and the like, are not shown but the inclusion of such are within the scope of the invention.

Referring to the drawing, naphthenic hydrocarbon feed stock boiling in the range of 150 to 450° F., preferably 220 to 300° F., is passed into hydroforming zone 11 through line 12. The stream withdrawn from the hydroforming zone through line 13 comprises a mixture of isomeric xylenes and higher and lower boiling materials. This stream, which will generally contain between 3 and 7 weight percent para-xylene, is passed through line 13 into a separation zone 14, wherein the stream is separated into fractions by a combination of fractionation and liquid-liquid extraction. Hydrocarbons lower boiling than the isomeric xylenes and hydrocarbons higher boiling than the isomeric xylenes are recovered from the separation zone through lines 16 and 17, respectively, while a stream comprising essentially isomeric xylenes is removed through line 18. This latter stream contains between 10 and 20 weight percent para-xylene and varying proportions of ethylbenzene and meta- and ortho-xylenes.

It has been found that when a mixture of isomeric xylenes containing between 10 and 20 weight percent para-xylene is cooled in a crystallizer, as described more in detail below, the para-xylene tends to form small, needle-like crystals. The presence of this type of crystal in the crystal slurry makes it difficult to obtain an effective separation of the para-xylene and mother liquor. For example, when filtering the crystal slurry, the small needle-like crystals have a tendency to pass through the filter medium and are lost in the mother liquor. By increasing the concentration of para-xylene in the xylene feed stream to the crystallizer to between 20 and 40 weight percent, as described hereinafter, the formation of small needle-like crystals therein is substantially eliminated, and easily filterable crystals are formed during the cooling operation.

The stream comprising essentially isomeric xylenes recovered from separation zone 14 is combined with a para-xylene concentrate introduced into line 18 through line 19. The para-xylene concentrate, in general, contains between about 40 to about 70 weight percent para-xylene, and the amount of this concentrate combined with the xylene stream from the separation zone is controlled so that the xylene feed stream charged to crystallizer 21 contains between about 20 to 40 weight percent para-xylene. It is also within the contemplation of the invention to introduce the para-xylene concentrate in liquid form directly into the crystallizer in order to increase the concentration of para-xylene in the mixture of isomeric xylenes contained therein. In crystallizer 21, the mixture of isomeric xylenes is cooled to a temperature at which para-xylene crystals are formed. A scraped surface chiller may be advantageously utilized as the crystallizer, but other types well known in the art come within the scope of the invention. The cooling temperature employed in the crystallizer is dependent upon the composition of the xylene feed stream introduced thereinto. Since it is desired to obtain a maximum crystallization of para-xylene without the formation of other contaminating crystals, in a preferred method of operation the temperature is lowered to just above the eutectic point of para-xylene with the next most easily crystallizable component. With a xylene feed stream containing between 20 and 40 weight percent para-xylene, a crystallizer temperature between −70° F. and −115° F. can be used, the particular temperature being dependent upon the composition of the feed to the crystallizer and the desired approach to the eutectic temperature.

A slurry of easily filterable para-xylene crystals in mother liquor is removed from crystallizer 21 through line 22. A first portion of the crystal slurry is passed through line 23 to filter 24 where mother liquor separated from the slurry is recovered through line 26. While any suitable filtering means may be employed to effect this separation, it is preferred to use a rotatable filter of the type commonly known as an Oliver filter. Para-xylene crystals containing occluded impurities are recovered from filter 24 and passed through line 19 where they are combined with the stream recovered from separation zone 14. When utilizing an Oliver filter, the crystals, which form as a cake on the filter medium, are scraped from the filter medium by a doctor blade and fall into a container. When operating in this manner, it is desirable to pass the stream from the separation zone into the container from which the para-xylene enriched stream is passed to crystallizer 21. The para-xylene crystals are substantially all in liquid form, by the time the feed stream is introduced into the crystallizer, having been melted as a result of being combined with the stream from the separation zone. It is also within the scope of the invention to provide lines 18 or 19 with a heat exchange means in order to assure that the crystals will be melted. An amount of slurry is passed from crystallizer 21 through line 23 to filter 24 sufficient to maintain the content of para-xylene in the feed stream to the crystallizer between about 20 and 40 weight percent. In general, the para-xylene concentrate recovered from the filter and combined with the stream from the separation zone contains between about 40 to 70 weight percent para-xylene. Since the stream from the separation zone is reduced in temperature by an amount substantially equal to the heat of fusion of the para-xylene concentrate, the refrigeration requirements of the system are not increased by this operation.

A second portion of the crystal slurry withdrawn from crystallizer 21 through line 22 is introduced into the upper portion of fractional crystallization apparatus 25. Fractional crystallization apparatus 25, as illustrated, comprises a filter section 29 disposed in the upper portion of a purification column 30, in the lower portion of which a melting zone is maintained by heat exchange means 32. The slurry of mother liquor and para-xylene crystals enters filter section 29 where the crystals are separated from the mother liquor which is withdrawn from the apparatus through line 28. The mother liquor withdrawn from the filter zone is thereafter combined with the mother liquor withdrawn from filter 24 through line 26.

The mass of crystals is moved downwardly through purification column 30 into the melting zone maintained in the lower end of the column. On reaching the melting zone, at least a portion of the crystals are melted, and a portion only of the resulting melt is withdrawn through line 33 while the remainder of the melt is displaced upwardly as a reflux stream through the downwardly moving mass of crystals and in intimate contact therewith. The reflux stream removed from purification column 30 through filter section 29 by means of line 31 may be recycled to crystallizer 21. By passing the reflux stream countercurrently to the movement of the crystals, the mass of crystals is subjected to a washing action, thereby removing occluded impurities from the crystals. The product stream removed from the crystal purification column through line 33 in the form of melt or a mixture of melt and para-xylene crystals contains 98 weight percent and higher of para-xylene.

The following illustrative example, which is not intended to be unduly limitative of the invention, will provide a more comprehensive understanding of the invention.

For this example, an arrangement of apparatus is utilized which is similar to that illustrated in the drawing. A feed stream comprising 100 gallons per hour of xylene concentrate obtained from a hydroforming process, 40 gallons per hour of recycle para-xylene concentrate, and 2 gallons per hour of reflux from a fractional crystallization apparatus is passed to a scraped surface chiller. The scraped surface chiller is operated at a temperature of about −100° F. The xylene concentrate obtained from the hydroforming process contains about 16 gallons per hour of para-xylene and 84 gallons per hour of isomeric xylenes. The recycle para-xylene concentrate stream comprises about 24 gallons per hour of para-xylene and 16 gallons per hour of isomeric xylenes, and the reflux stream contains about 1 gallon per hour of para-xylene and 1 gallon per hour of isomeric xylenes. Accordingly, 142 gallons per hour of feed comprising 41 gallons per hour of para-xylene and 101 gallons per hour of isomeric xylenes is introduced into the scraped surface chiller. The slurry from the chiller comprises 36 gallons per hour of para-xylene crystals and 106 gallons per hour of mother liquor. At the operating temperature of −100° F., the mother liquor removed from the chiller contains about 6 weight percent para-xylene. A part of the slurry removed from the chiller, namely, 96 gallons per hour comprising 24 gallons per hour of para-xylene crystals and 72 gallons per hour of isomeric xylenes, is filtered by a rotary filter to obtain 40 gallons per hour of para-xylene concentrate comprising 24 gallons per hour of para-xylene and 16 gallons per hour of isomeric xylenes. The para-xylene concentrate is combined with the xylene concentrate obtained from the hydroforming process as indicated above. The remaining portion of the slurry, namely, 46 gallons per hour comprising 12 gallons per hour of para-xylene crystals and 34 gallons per hour of mother liquor, is introduced into the fractional crystallization apparatus. The mother liquor removed from the rotary filter and through the filter zone of the fractional crystallization apparatus contains no para-xylene crystals and comprises 6 gallons per hour of para-xylene liquid and 83 gallons per hour of isomeric xylenes. The product recovered from the fractional crystallization apparatus contains 11 gallons per hour of para-xylene and 0.20 gallon per hour of isomeric xylenes. The product thereby obtained has a purity of about 98 weight percent para-xylene. Of the para-xylene present in the xylene concentrate obtained from the hydroforming process, 69 percent is recovered as product while the concentration of para-xylene in the mother liquor is only 6 weight percent. It should be apparent from the foregoing that a very efficient process is provided for the recovery of para-xylene from a mixture of isomeric xylenes.

By carrying out the separation and purification of a liquid multi-component mixture as described above, a process is provided wherein the formation of small, needle-like crystals is substantially eliminated. Because of the elimination of small needle-like crystals, a more efficient separation process is made possible, resulting in a higher rate of product recovery. While the invention has been described with relation to a particular crystal separation and purification apparatus, it is not intended to limit the invention to any specific apparatus. Accordingly, it is within the scope of the invention to utilize other types of fractional crystallization apparatus which use a displaced reflux stream to obtain a high purity product, e.g., those disclosed by J. Schmidt in U.S. Patent No. 2,617,274, and by D. L. McKay in copending U.S. application, Serial No. 375,850, filed August 24, 1953, now abandoned. Furthermore, the present invention is applicable to other types of apparatus, e.g., centrifuges, or to any installation wherein it is desired to obtain easily filterable crystals. It is also to be understood that it is not intended to limit this invention to the recovery of the higher melting product, but it is within the contemplation of the invention to concentrate dilute solutions in which case the mother liquor will be recovered as product.

As will be evident to those skilled in the art, various modifications of this invention can be made or followed in the light of the foregoing disclosure and discussion without departing from the spirit or scope of the invention.

I claim:
1. In a continuous process for separating a crystallizable component from a liquid multi-component mixture, said component tending to form small needle like crystals upon cooling of said mixture, which comprises cooling said mixture in a cooling zone so as to crystallize said component; removing crystallized material and mother liquor from said cooling zone; passing a first portion of said crystallized material and mother liquor into a filter zone; separating mother liquor from said first portion in said filter zone so as to form a concentrate of said component; passing said concentrate as a liquid into said cooling zone; passing crystals of a second portion of said crystallized material and mother liquor into a crystal separation and purification zone; and recovering purified crystallizable material from said crystal separation and purification zone as product.

2. The process of claim 1 wherein said liquid multi-component mixture comprises alkylbenzenes.

3. The process of claim 2 wherein said mixture contains para-xylene and said para-xylene is recovered as the product.

4. The process of claim 1 wherein said liquid multi-component mixture comprises benzene and a paraffinic hydrocarbon and benzene is recovered as the product.

5. The process of claim 1 in which said multi-component mixture comprises cyclohexane and a paraffinic hydrocarbon and cyclohexane is recovered as the product.

6. In a continuous process for separating a component from a liquid multi-component mixture, said component tending to form small needle like crystals upon the cooling of said mixture, the improvement which comprises cooling said mixture in a cooling zone to a temperature such as to form crystallized material and mother liquor; passing a first portion of said crystallized material and mother liquor into a filter zone; separating mother liquor from said first portion in said filter zone so as to form a concentrate of said component; combining said concentrate as a liquid with said mixture so as to increase the concentration of said component in said mixture; introducing said mixture enriched in said component into said cooling zone; passing crystals of a second portion of said crystallized material and mother liquor into a crystal separation and purification zone; and recovering a purified crystallizable material from said separation and purification zone.

7. In a continuous process for separating a component from a liquid multi-component mixture, said component tending to form small needle like crystals upon the cooling of said mixture, the improvement which comprises cooling said mixture in a cooling zone to a temperature such as to form a slurry of said crystals and mother liquor; passing a first portion of said slurry to a first filter zone; separating mother liquor from said first portion in said first filter zone so as to form a concentrate of said component; combining said concentrate as a liquid with said mixture so as to increase the concentration of said component in said mixture; introducing said mixture enriched in said component into said cooling zone; passing a second portion of said slurry into a second filter zone; separating crystals from said second portion in said second filter zone; passing said crystals into a purification zone so as to form therein a mass of crystals; moving said mass of crystals through said purification zone into a melting zone maintained at a temperature at least as high as the melting point of said crystals; melting at least a portion of said crystals; displacing a portion of the resulting melt through said mass of crystals and in intimate contact therewith so as to remove occluded impurities therefrom; and recovering as product from said melting zone purified crystallizable material.

8. A process for separating para-xylene from a mixture of the same and at least one isomeric xylene which comprises cooling said mixture in a cooling zone to a temperature such as to form a slurry of para-xylene crystals and mother liquor; passing a first portion of said slurry to a filter zone; removing mother liquor from said first portion in said filter zone so as to form a para-xylene concentrate as a liquid; combining said para-xylene concentrate with said mixture; introducing said mixture enriched in para-xylene into said cooling zone; passing a second portion of the slurry removed from said cooling zone into a crystal separation and purification zone; and recovering substantially pure para-xylene from said separation and purification zone.

9. The process of claim 8 wherein said para-xylene concentrate contains between about 40 and 70 weight percent para-xylene.

10. The process of claim 8 wherein said mixture introduced into said cooling zone contains between about 20 and 40 weight percent para-xylene.

11. In a continuous process for recovering a concentrated solution from a liquid mixture containing a crystallizable solvent which tends to form as small needle like crystals upon cooling said mixture, which comprises cooling said mixture in a cooling zone to a temperature such as to form a slurry comprising crystals of said solvent and mother liquor; passing a first portion of said slurry to a first filter zone; separating mother liquor from said first portion in said first filter zone so as to form a concentrate of said solvent; combining said concentrate as a liquid with said mixture so as to increase the concentration of said solvent in said mixture; introducing said mixture enriched in said solvent into said cooling zone; passing a second portion of said slurry into a second filter zone; separating mother liquor from said slurry in said second filter zone; passing said crystals into a purification zone so as to form therein a mass of crystals; moving said mass of crystals into a melting zone maintained at a temperature at least as high as the melting point of said crystals; melting at least a portion of said crystals; displacing a portion of the resulting melt as a reflux stream through said mass of crystals and in intimate contact therewith; withdrawing at least a portion of said reflux stream from said second filter zone along with said mother liquor; and recovering said mother liquor from said first filter zone and said reflux and said mother liquor from said second filter zone as product.

References Cited in the file of this patent

UNITED STATES PATENTS

| | | |
|---|---|---|
| 2,517,601 | Shafor et al. | Aug. 8, 1950 |
| 2,651,665 | Booker | Sept. 8, 1953 |
| 2,683,178 | Findlay | July 6, 1954 |
| 2,738,254 | Suhr | Mar. 13, 1956 |
| 2,766,309 | Speed et al. | Oct. 9, 1956 |

UNITED STATES PATENT OFFICE

CERTIFICATE OF CORRECTION

Patent No. 2,931,841                                                        April 5, 1960

Albert N. De Vault

It is hereby certified that error appears in the printed specification of the above numbered patent requiring correction and that the said Letters Patent should read as corrected below.

Column 6, line 60, after "mixture," insert -- the improvement --; column 7, line 52, after "A" insert -- continuous --; column 8, line 5, strike out "as a liquid" and insert the same after "concentrate" in line 6, same column 8; line 21, after "mixture," insert -- the improvement --.

Signed and sealed this 29th day of November 1960.

(SEAL)
Attest:

KARL H. AXLINE
Attesting Officer

ROBERT C. WATSON
Commissioner of Patents